United States Patent [19]

Brown

[11] Patent Number: 5,095,565
[45] Date of Patent: Mar. 17, 1992

[54] METAL RAIL BED FOUNDATION

[75] Inventor: Daniel E. Brown, West Lafayette, Ind.

[73] Assignee: The Ohio Mattress Company Licensing and Components Group

[21] Appl. No.: 526,392

[22] Filed: May 21, 1990

[51] Int. Cl.$^5$ ............................................. A47C 23/00
[52] U.S. Cl. ........................................ 5/200.1; 5/204; 5/264.1; 5/286; 5/403; 5/409; 403/295; 403/402; 403/403
[58] Field of Search ............... 5/200.1, 204, 205, 206, 5/246, 263, 264.1, 282.1, 286, 402, 403, 405, 406, 409; 403/295, 401, 402, 403

[56] References Cited

U.S. PATENT DOCUMENTS

| | | |
|---|---|---|
| 1,299,890 | 4/1919 | Young . |
| 1,899,188 | 2/1933 | Falls ............................... 5/409 |
| 1,977,051 | 10/1934 | Falls .......................... 5/264.1 X |
| 1,997,237 | 4/1935 | Schrier ........................... 5/409 |
| 2,097,976 | 11/1937 | Haberstump ............... 5/264.1 X |
| 2,237,585 | 4/1941 | De Fries ..................... 5/264.1 X |
| 2,841,209 | 7/1958 | Wetzler ...................... 5/200.1 X |
| 3,302,220 | 2/1967 | Gauthier . |
| 3,451,073 | 6/1969 | Surletta et al. . |
| 3,506,987 | 4/1970 | Bielak . |
| 3,657,749 | 4/1972 | Norman . |
| 3,665,529 | 5/1972 | Slominski . |
| 3,680,157 | 8/1972 | Slominski et al. . |
| 3,755,833 | 9/1973 | Slominski . |
| 3,824,639 | 7/1974 | Mandusky . |
| 3,950,797 | 4/1976 | Bronstien, Jr. ................. 5/200.1 |
| 4,207,634 | 6/1980 | Kitchen et al. . |
| 4,303,289 | 12/1981 | Hardy ........................ 403/295 X |
| 4,470,584 | 9/1984 | Mizelle . |
| 4,570,406 | 2/1986 | DiFazio ..................... 403/402 X |
| 4,779,292 | 10/1988 | Dabney . |
| 4,861,002 | 8/1989 | Dabney . |
| 4,870,711 | 10/1989 | Felix .............................. 5/200.1 |

Primary Examiner—Michael F. Trettel
Attorney, Agent, or Firm—Willian Brinks Olds Hofer Gilson & Lione

[57] ABSTRACT

A bedding foundation comprises a pair of elongated rigid metal side rails, a pair of elongated rigid metal end rails, the side and end rails being fixed to each other and arranged to form a rectangle. A plurality of elongated rigid metal cross rails are fixed to and extend across the rectangle in spaced parallel relationship to one another. The side and end rails are joined together by insertion of an end of a respective side and end rail into respective channels of a corner joint having two open-ended channels formed therein at right angles to each other. The foundation rails comprise a top portion with a pair of side portions depending from the top portion defining a generally U-shaped channel with the top portion. Foundation covering is preferably attached to the foundation by tacking it to the metal rail or to a penetrable material carried within the side and end rail channels, or by using an elongated wedge to fix the covering within these channels.

18 Claims, 4 Drawing Sheets

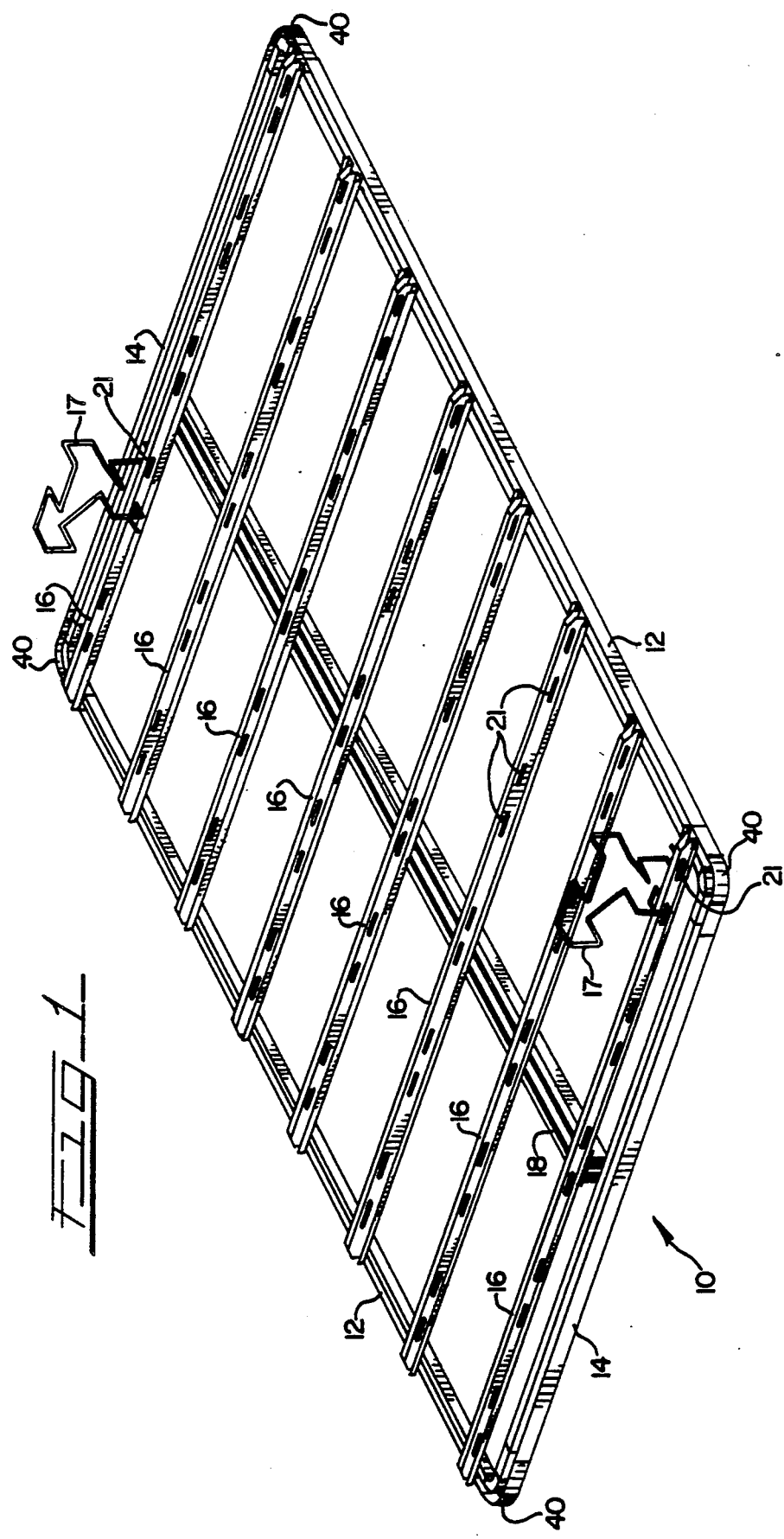

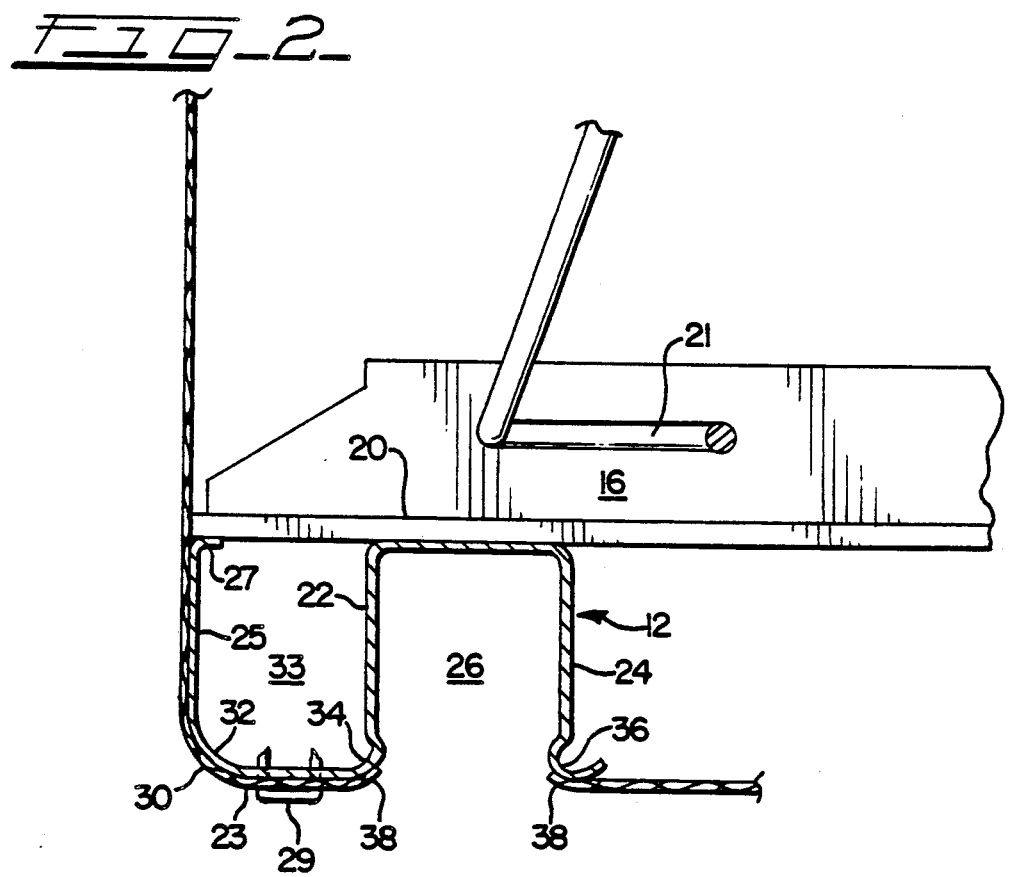

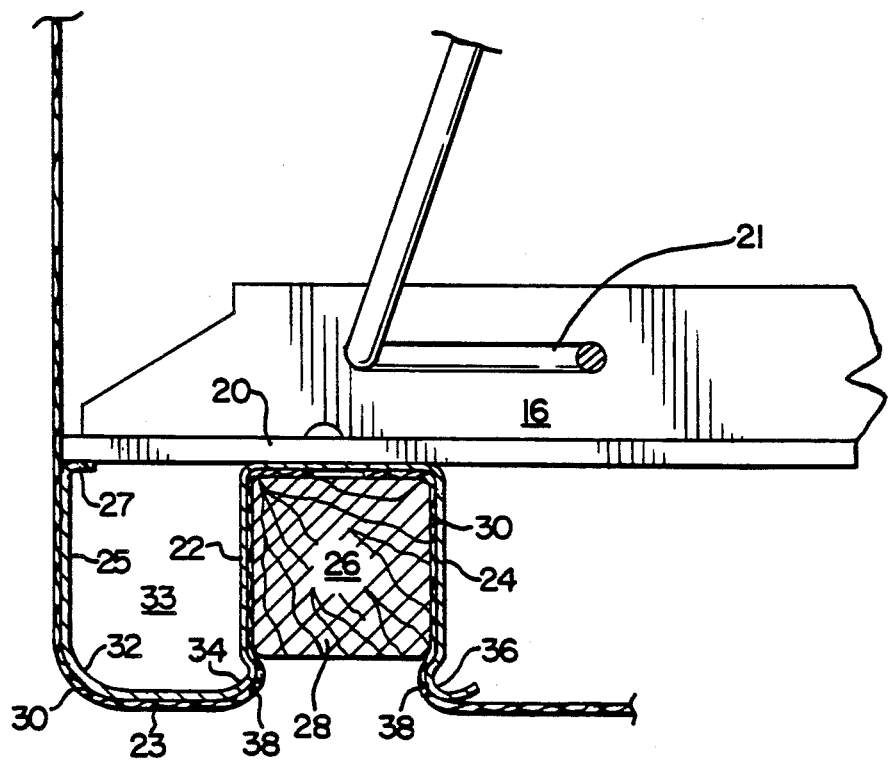
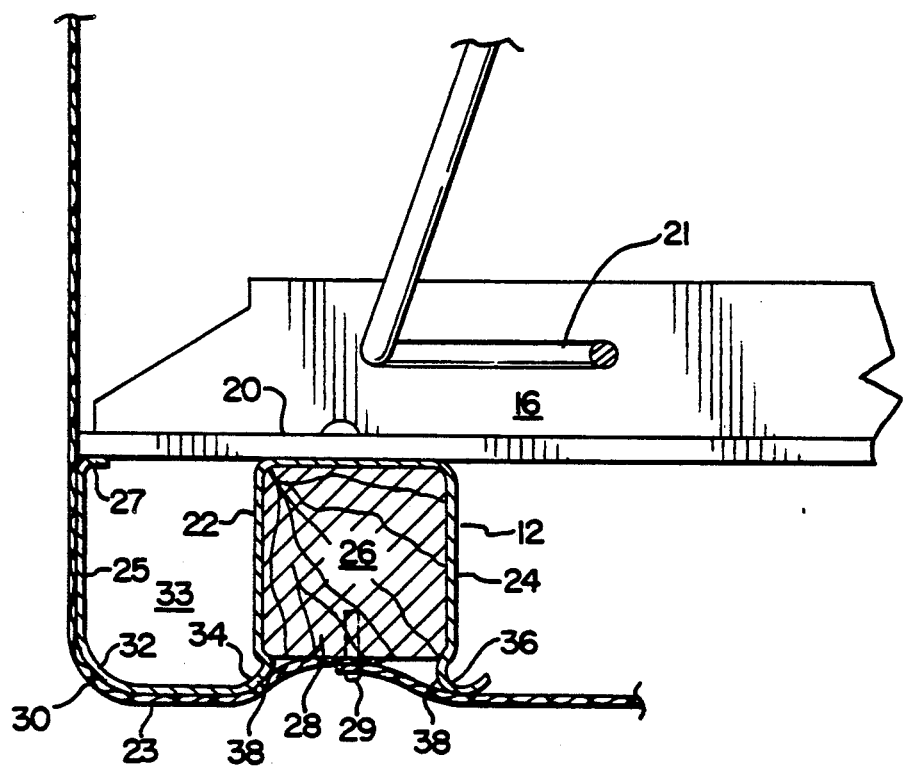

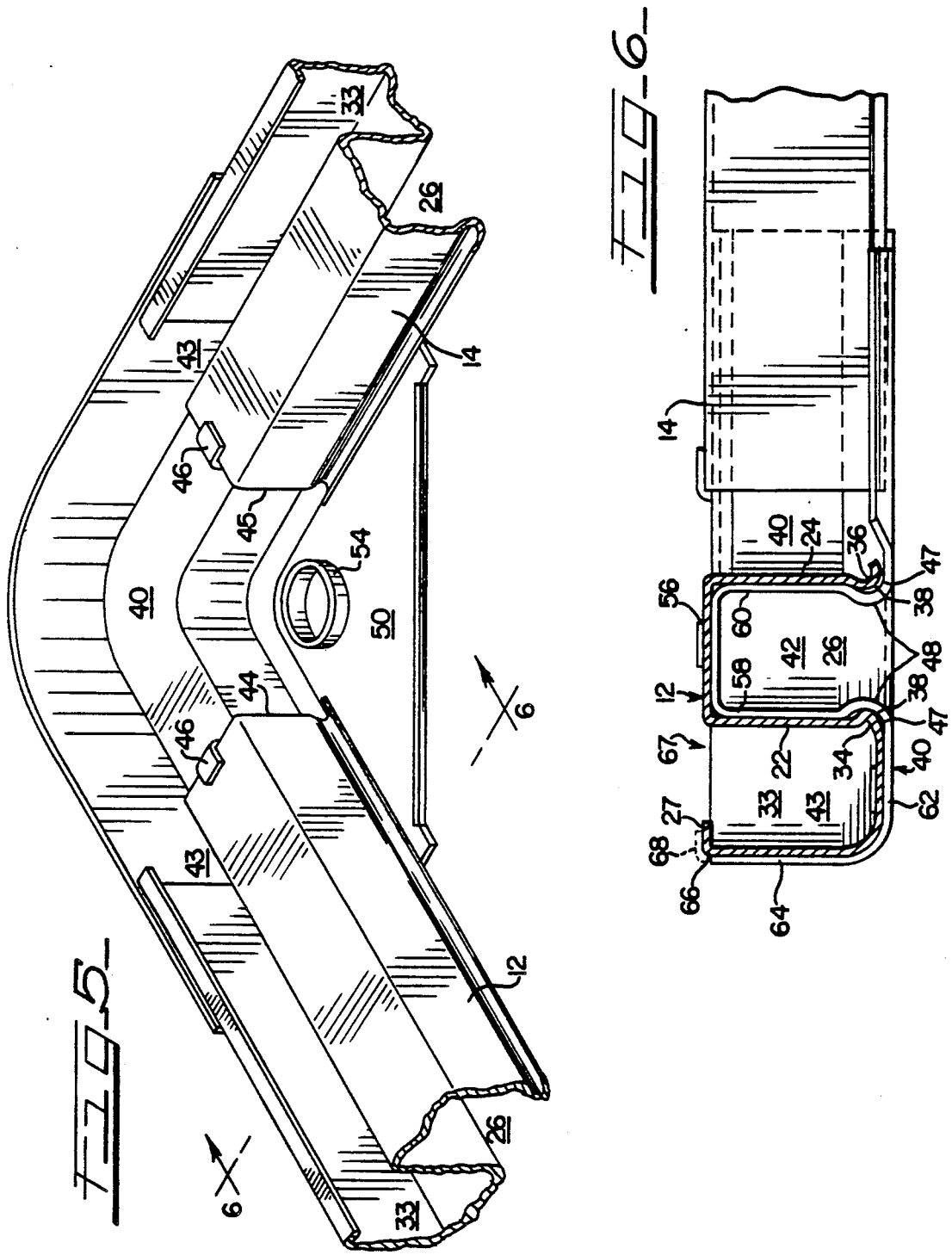

METAL RAIL BED FOUNDATION

FIELD OF THE INVENTION

This invention generally relates to bedding foundations, and more particularly to a bedding foundation which utilizes metal side rails and metal end rails affixed to each other by corner joints and arranged to form a rectangle.

BACKGROUND ART

A bedding foundation or "box spring" generally has a wood base frame upon which springs are mounted. Coil or torsion bar springs are typically used. The frame has wooden side and end rails defining its perimeter, with wood or metal cross rails, or spans, extending between the side rails. The feet of the springs are typically stapled directly to the frame members, or inserted in slots on metal spans.

A metal box spring frame assembly is shown in Surletta et al., U.S. Pat. No. 3,431,073, which discloses end and side rails of metal connected together by corner elements into a rectangular frame. A plurality of metal spans is connected by a flange and groove arrangement to the side members and shaped to retain a plurality of springs.

Mizelle, U.S. Pat. No. 4,470,584, discloses a box spring assembly which utilizes channel-shaped metal cross rails having horizontal spring mounting slots. Still another type of foundation is disclosed in Gauthier, U.S. Pat. No. 3,302,220, where the supporting frame consists of a lightweight metal framework with triangular corner-brackets. Norman, U.S. Pat. No. 3,657,749, shows a substantially planar rail-type construction used as a border for the spring assembly.

Although metal foundations are generally described above, the use of rigid metal end and side rails has not seen commercial acceptance. Cost of metal vs. wood has been a factor, particularly since metal rails must generally be formed from light stock to be at all cost-effective and saleable. Attachment of the metal rails together is also a problem, as is attachment of cloth and ticking to the metal rails.

SUMMARY OF THE INVENTION

A principal objective of this invention is to provide an improved bedding foundation in which elongated rigid metal side rails and end rails are arranged to form a rectangle, and a plurality of elongated rigid metal cross rails are fixed and extend across the rectangle, in an assembly which is readily assembled and of competitive price with wooden foundations.

It is a further objective to provide a strong, but lightweight, foundation where a foundation covering may be smoothly, easily and securely attached to the foundation rails.

To these and other ends, the present invention comprises a bedding foundation having a pair of elongated rigid metal side rails and a pair of elongated rigid metal end rails. Four rigid metal corner joints define two open-ended channels formed at right angles to each other. The side and end rails are joined together and arranged to form a rectangular frame by insertion of an end of a respective side and end rail into the respective channels of a corner joint.

The elongated metal side and end rails include a top portion with a pair of side portions depending from the top portion defining a generally U-shaped channel with the top portion. A plurality of elongated rigid metal cross rails or spans are fixed to and extend across the rectangle in a spaced parallel relationship to one another. Attaching means are provided on the cross rails to fasten the springs on the cross rails.

The metal end and side rails preferably include a second U-shaped channel, to thereby form a horizontal S-shaped channel construction for the rails. A third side portion and a bottom portion are provided on the rails to this end. The third side portion further has a top edge which is co-planar with the top portion of the first U-shaped channel. The third side portion also defines a rounded edge with the bottom portion to facilitate tightly drawing the foundation covering against the third side and bottom portion and to prevent a sharp corner that may tear material.

Advantageously, the bottom portion of the second U-shaped channel of the end and side rails is made to be penetrable by mechanical fasteners for fixing the foundation covering to the rails. Adhesive, in lieu of mechanical fasteners, may be used to attach the covering to the rails.

Alternatively, a rigid or semi-rigid material or member penetrable by staples is received and held within the first U-shaped channel. Cloth can be stapled or tacked to this material, or the material can operate as an elongated wedge means received in the first U-shaped channel for mechanically fixing foundation covering cloth within the channel by wedging the material in the channel.

A method of constructing a beeding foundation comprises: providing a pair of elongated rigid metal side rails and a pair of elongated rigid metal end rails having the generally U-shaped channel with the top portion described above. Four rigid metal corner joints include two open-ended channels formed therein at right angles to each other. The open-ended channels slidably engage within the U-shaped channels of side and end rails by inserting and end of a respective side and end rail into respective channels of a corner joint. A plurality of elongated rigid metal cross rails are then fixed to extend across the rectangular frame in spaced parallel relationship to one another.

As pointed out in greater detail, the bedding foundation of this invention provides important advantages. The frame is made of elongated rails which are readily insertable into the channels of corner joints to form a strong interlocked connection when the rails and joints are welded together. Use of first and second U-shaped channels with a common vertical member creates a very strong, but lightweight, horizontal S-shaped channel which has three vertical metal members supporting the cross rails. Rounded sides to the rails provide a smooth rounded surface to attach the foundation covering without causing rips, tears and other damage caused by sharp edges. The cross joints are formed with identically shaped channels and form a very rigid, strong interconnection with the side and end rails. Perhaps the most exemplary feature of the invention, however, is the unique use of a staple penetrable member received in the U-shaped channel. Cloth can be stapled to this member, or alternatively the member can be used as a wedge to fix the material in place without the use of staples.

Further understanding of the invention itself, together with further objects and its attendant advantages, can be obtained from consideration of the following detailed description of an embodiment and certain modifications thereof, of the invention taken in conjunction with the drawings, in which:

BRIEF DESCRIPTION OF THE DRAWINGS

FIG. 1 is a perspective view of a bedding foundation embodying features of the present invention;

FIG. 2 is an enlarged cross sectional view taken along line 2—2 of FIG. 1 with the addition of a foundation covering attached to the side rail;

FIG. 3 is a view similar to that of FIG. 2 of another embodiment of the invention;

FIG. 4 is a view similar to that of FIG. 2 showing foundation covering material wedged into the side rail of the present invention;

FIG. 5 is an enlarged fragmentary isometric view of a corner joint of the bedding foundation embodying features of the present invention; and FIG. 6 is a cross sectional view along line 6—6 of FIG. 5.

DETAILED DESCRIPTION OF EMBODIMENTS OF THE INVENTION

Referring to FIG. 1 of the drawings, a preferred embodiment of the bedding foundation 10 generally comprises a pair of elongated rigid metal side rails 12 and a pair of elongated rigid metal end rails 14. The side and end rails 12 and 14 are fixed to each other and arranged to form a rectangular frame using corner joints 40. A plurality of elongated rigid metal cross rails 16 are fixed, as by welding, to and extend across the rectangular shaped foundation in spaced parallel relationship to one another. Attaching means for fastening springs 17 to the cross rails 16 include slots 21 and are provided on the cross rails 16. If needed or desired, a middle rail 18 may be used.

As best shown in FIGS. 2-4, the elongated metal rails 12 and 14 have a top portion 20 with a pair of side portions 22 and 24 depending from the top portion 20 and defining a downwardly open generally U-shaped channel 26 with the top portion 20. A bottom portion 23 extends from side 22, with a third side portion 25 extending upwardly in an inwardly turned edge 27. Edge 27 is formed to be co-planar or at about the same height as the top portion 20. Cross rails 16 thus bear upon edge 27 as well as top portion 20, such that side portion 25 provides additional support for cross rails 16.

The bottom portion 23, side portion 25, and side portion 22 of side and rails 12 and 14 define a second inverted U-shaped channel 33. This channel 33 together with U-shaped channel 26 forms an overall horizontal S-shaped channel 35 to the rails. This S-shaped channel 35 enhances the rigidity of side and end rails 12 and 14, yet provides a lightweight but very strong support for the cross rails and frame. Relatively thin folded sheet metal can thereby be used for the rails. A 23 gauge steel sheet metal can be used which is formed into the indicated S-shape by roll-forming.

As shown in FIG. 2, the bottom portion 23 of end and side rails 12 and 14 are made thin enough to be penetrable by mechanical fasteners 29, such as staples, metal screws, rivets, or the like, for fastening a foundation covering 30 (or other bedding material) to the rails 12 and 14. Typically, the foundation covering 30 covers the springs 17 and is secured to all sides of the frame 13.

In accordance with one unique feature of the invention, and as shown in FIG. 3, a rigid or semi-rigid material 28, such as a wood or plastic member, which is also penetrable by mechanical fasteners 29, such as staples, metal screws, rivets, or the like, is received and held within channel 26. Foundation covering 30 is shown attached to the rigid material 28 by the staples 29' which are driven into the material 28 in a conventional fashion.

As shown in FIG. 4, the material 28 can be an elongated wedge received in the channel 26 for mechanically fixing the foundation covering 30 within the channel 26 by wedging the covering 30 in the channel 26. When used as a wedge, material 28 need not be penetrable by staples and the like.

The third side portion 25 and bottom portion 23 form a rounded corner 32 on outboard side of the rails 12 and 14 which enables the foundation covering 30 to be tightly drawn against the rails 12 and 14 and securely fastened without damaging the covering 30. In addition to the above mechanical fasteners, state of the art adhesives may be used to secure the covering 30 to the rails 12 and 14 at either of the side portions 22, 24 or 25, or the top or bottom portion 20 or 23, or a combination thereof.

Rounded corners 34 and 36 are formed at the entry to the U-shaped channel 26 which in turn form protrusions 38 which extend into the channel 26. The protrusions provide a function of engaging a matched corner joint channel 42, as described hereinafter, but also serve another function of engaging and holding the rigid material 28 wedged in the channel 26. The corners 34 and 36 also protect the foundation covering 30 from tears and other damage incurred by exposure to sharp edges.

Rigid material 28 is inserted into channel 26 which flexes the channel side portions and increases the width of the U-shaped channel 26 as the rigid material 28 moves by channel protrusions 38. Once clear of the protrusions 38, the resilient sides 22 and 24 of the channel 26 return to the original channel width whereby protrusions 38 lock the material 28 into the channel.

As shown in FIG. 4, an elongated wedge 28 is used to fix foundation covering 30 in the U-shaped channel 26. The foundation covering 30 and the wedge 28 are positioned in the channel 26, and moved past the protrusions 38. The foundation covering 30 is thereby mechanically fixed within the channel 26. The side walls 22 and 24, as described above, flex and widen the channel 26 as the wedge 28 is positioned into the channel 26 along with foundation covering 30. Once past the channel protrusions 38, the resilient side walls 22 and 24 then tightly grasp, hold, and lock the foundation covering 30 along with the wedge 28 in the channel 26.

In the illustrated embodiment, the bedding foundation 10 comprises a pair of elongated rigid metal side rails 12, a pair of elongated rigid metal end rails 14, and four rigid metal corner joints 40 having two open-ended U-shaped joint channels 42 formed therein at right angles to each other. The cross-section of the joints 40 thus matches that of the rails 12, 14.

As shown in FIGS. 5 and 6, the side and end rails 12 and 14 are joined together and arranged to form a rectangular frame by insertion of an end 44, 45 of a respective side 12 and end rail 14 into respective channels 42 of a corner joint 40. Raised fingers or tabs 46 extend from the joints to correctly position, support and engage the side and end rails 12 and 14 in a fixed position. The rails 12, 14 can then be welded, riveted or otherwise permanently secured to the joints 40.

The corner joints 40 have a top portion 56 and side portions 58 and 60 which define a first U-shaped channel 42. A bottom portion 62 extends from side 58 with a third side portion 64 extending upwardly to define a second inverted U-shaped channel 43 having a common side portion 58 with the first U-shaped shaped channel. A horizontal S-shaped channel 67 substantially similar to that of the rails 12, 14 is thereby formed. The third side portion 64 includes an end 66 which is terminated to form an edge at the same height level of top portion 56. Alternatively, end 66 could be further extended to form an edge 68 (shown in phantom line) which terminates at a height above the joint top 56. The extension 68 forms an additional point of support to strengthen the engagement between U-shaped channels 33 and 43.

The corner joint channels 42 include rounded corners 47 and extending protrusions 48. Rounded corners 47 slidably engage protrusions 38 when the corner joint 40 is inserted into the rail U-shaped channel 26. This insertion of protrusion 38 into corners 47 interlocks and connects the joint channels 42 in a manner where the side and end rails 12 and 14 and the corner joint 40 form a strong, but lightweight frame 13. A triangular support member 50 in the form of a web extends across the bottom of the corner joint 40. An opening 52 with a reinforced collar 54 is provided in the web 50 for inserting a shaft for a roller, caster or other support member (not shown) therein. The corner joint is formed by press working.

The method of constructing an improved bedding foundation 10 comprises providing a pair of elongated rigid metal side rails 12 and a pair of elongated rigid metal end rails 14. The side and end rails 12 and 14 have a top portion 20 with a pair of side portions 22 and 24 depending from the top portion 20 defining a first generally U-shaped channel 26 with the top portion 20. Four rigid metal corner joints 40 include open-ended channels 42 formed therein at right angles to each other. The side and end rails 12 and 14 are joined together and arranged to form a rectangular frame by inserting an end 44, 45 of a respective side and end rail 12 and 14 into respective channels 42 of a corner joint 40. A plurality of elongated rigid metal cross rails 16 are fixed to extend across the side rails 12 in spaced parallel relationship to one another. Means for attaching springs 17 to the cross rails 16 are provided on the cross rails 16, such as slots 21. A foundation covering 30 covers the springs 17 and is secured to side and end rails 12 and 14. A material 28 is advantageously provided to this end, either made penetrable for stapling of the foundation covering 30 or as an elongated wedge for securing the covering.

Thus, while the invention has been described in relation to a particular embodiment with variations thereon, those skilled in the art will recognize various modifications of structure, elements, material and the like which may further facilitate application of the invention, while still falling within the scope of the invention.

What is claimed is:

1. A bedding foundation comprising:
    a pair of elongated metal side rails;
    a pair of elongated metal end rails;
    four rigid metal corner joints having open-ended channels formed therein at right angles to each other;
    said side and end rails and corner joints each having a top portion with a pair of side portions depending from said top portion defining a generally U-shaped channel with said top portion and having a laterally extending bottom portion and a third side defining a second inverted U-shaped channel, one of said side portions defining a common side for said first and second U-shaped channels to form a horizontal S-shaped channel, said side and end rails being joined together and arranged to form a rectangular frame by insertion of an end of a respective side and end rail into respective channels of a corner joint; and
    a plurality of elongated rigid metal cross rails fixed to and extending across said rectangular frame in spaced parallel relationship to one another, with means for attaching springs to said cross rails provided on said cross rails.

2. The bedding foundation of claim 1, wherein said top portion of said corner joints have protrusions formed at the entrance of said corner joint channels to act as stops for said side and end rails and to connect the joint channels to the side and end rails.

3. The bedding foundation of claim 1, wherein said third side portion includes an inboard extending edge which is planar with the top portion of the first U-shaped channel.

4. The bedding foundation of claim 3, wherein said third side portion defines a rounded corner with said bottom portion for tightly drawing foundation covering against said third side and bottom portion.

5. The bedding foundation of claim 4, wherein said foundation includes foundation covering positioned over the springs and affixed to the side and end rails.

6. The foundation covering of claim 5, wherein said covering is affixed to the side and end rails by adhesive.

7. The bedding foundation of claim 5, wherein said bottom portions of the second U-shaped channel of said end and side rails are penetrable by mechanical fasteners for mechanically fixing foundation covering to said rail.

8. The bedding foundation of claim 7, wherein said mechanical fasteners are staples.

9. The bedding foundation of claim 1 further including a rigid material penetrable by staples received and held within said side and end rail channels.

10. The bedding foundation of claim 1 further comprising elongated wedge means received in said side and end rail channels for mechanically fixing foundation covering within said channel by wedging the material therein.

11. An improved rail for the perimeter of a bedding foundation comprising:
    an elongated metal rail having a top portion with a pair of side portions depending from said top portion defining a first generally U-shaped channel with said top portion,
    a bottom portion and a third side extending from said bottom portion defining a second inverted U-shaped channel, one of said side portions forming a common side portion for said first and second U-shaped channel to form a horizontal S-shaped channel.

12. The improved rail of claim 11, wherein said third side portion defines rounded corners with said bottom portion and depending edge for tightly drawing foundation covering against said third side portion and bottom portion.

13. The improved rail of claim 12, wherein said bottom portion of the second U-shaped channel of said end and side rails is penetrable by mechanical fasteners for mechanically fixing foundation covering to said rail.

14. The improved rail of claim 12, wherein said rail further includes a rigid material penetrable by staples received and held within a channel.

15. The improved rail of claim 11 wherein said rail further includes elongated wedge means received in said channel for mechanically fixing bedding material within a channel by wedging the material therein.

16. An improved frame member for the perimeter of a bedding foundation comprising:
   an elongated metal rail having a top portion with a pair of side portions depending from said top portion defining a generally U-shaped channel with said top portion at least one of said side portions being resiliently deflectable away from the other of said pair; and
   an elongated wedge means penetrable by foundation covering tacking means and received in said channel in a snap fit by deflecting said resiliently deflectable side portion to fix foundation covering by at least one of wedging and tacking.

17. The frame member of claim 16, wherein said channel further includes protrusions formed along said side portion of said channel and extending into said channel adjacent a channel opening extending along the length of said rail to lock said wedge means in the channel.

18. A bedding foundation comprising:
   a pair of elongated metal side rails having U-shaped channels;
   a pair of elongated metal end rails having U-shaped channels;
   four metal corner joints having U-shaped channels formed therein at right angles to each other, said U-shaped channels of said side rails, end rails and corner joints each having a top portion with a pair of side portions depending from said top portion defining said U-shaped channel, said side and end rails being joined together and arranged to form a rectangular frame by insertion of an end of a respective side and end rail into respective channels of a corner joint, at least one of said side portions of said side and end rails having at least one protrusion extending into said channel;
   a plurality of elongated rigid metal cross rails fixed to and extending across said rectangular frame in spaced parallel relationship to one another;
   a plurality of springs attached to said side, end and cross rails forming a support surface;
   foundation covering positioned over the springs; and
   an elongated wedge means penetrable by foundation covering tacking means and received in said U-shaped channels in a snap fit by passing over said at lest one protrusion to fix said foundation covering by at least one of wedging and tacking.

* * * * *

UNITED STATES PATENT AND TRADEMARK OFFICE
CERTIFICATE OF CORRECTION

PATENT NO. : 5,095,565
DATED      : March 17, 1992
INVENTOR(S): Daniel E. Brown

It is certified that error appears in the above-identified patent and that said Letters Patent is hereby corrected as shown below:

Column 7:
    In claim 10, line 6, after "top portion" insert --,--.

Column 8:
    In claim 24, line 27, delete "lest" and substitute therefor --least--.

Signed and Sealed this

Fifteenth Day of March, 1994

Attest:

BRUCE LEHMAN

Attesting Officer

Commissioner of Patents and Trademarks